United States Patent [19]

Schwarz

[11] 4,199,645
[45] Apr. 22, 1980

[54] MULTI-LAYER ADHESIVE MATERIAL COMPRISING TWO EXTERNAL ADHESIVE LAYERS AND AN INTERNAL ELASTIC LAYER AND METHOD OF USING SAME FOR BONDING BODIES TO ONE ANOTHER

[76] Inventor: Günter Schwarz, Steinacherstr. 67, 8804 Au, Zürich, Switzerland

[21] Appl. No.: 874,426

[22] Filed: Feb. 2, 1978

[30] Foreign Application Priority Data

Feb. 16, 1977 [CH] Switzerland ............... 1940/77

[51] Int. Cl.² ............... C09J 5/02; C09J 5/04; C09J 5/06; C09J 7/02
[52] U.S. Cl. ............... 428/339; 156/313; 156/320; 156/321; 156/322; 428/40; 428/354
[58] Field of Search ............... 428/355, 339, 354, 40; 156/313, 320, 321, 322

[56] References Cited

U.S. PATENT DOCUMENTS

| | | | |
|---|---|---|---|
| 2,292,024 | 8/1942 | Dreher | 428/354 |
| 2,328,057 | 8/1943 | Coulter | 428/355 |
| 2,358,831 | 9/1944 | Schieman | 428/355 |
| 2,599,359 | 6/1952 | Banks et al. | 428/354 |
| 2,607,709 | 8/1952 | Simpson | 428/354 |
| 2,889,038 | 6/1959 | Kalleberg | 428/354 |
| 3,022,196 | 2/1962 | Jenkins et al. | 428/355 |
| 3,160,549 | 12/1964 | Caldwell et al. | 428/354 |
| 3,800,449 | 4/1974 | Minatodani et al. | 428/446 |
| 3,876,454 | 4/1975 | Snell et al. | 428/355 |

Primary Examiner—J. C. Cannon
Attorney, Agent, or Firm—Werner W. Kleeman

[57] ABSTRACT

A multi-layer adhesive material for producing an adhesive bond between two essentially mutually parallel surfaces, especially for providing an adhesive bond between a surface of a ski and a surface of an attachment body for the ski, wherein the multi-layer adhesive material contains two outer adhesive surfaces and at least one predominantly elastic carrier layer. There is provided in addition to the predominantly elastic carrier layer at least one predominantly plastic carrier layer having at its outwardly directed side or face one of the two adhesive surfaces of the adhesive material.

The method of using such adhesive material for establishing an adhesive connection between the aforementioned surfaces contemplates profiling the surface of the body to be connected with another body for increasing its adhesive surface, and which profiled surface faces the predominantly plastic carrier layer of the adhesive material.

9 Claims, 3 Drawing Figures

MULTI-LAYER ADHESIVE MATERIAL COMPRISING TWO EXTERNAL ADHESIVE LAYERS AND AN INTERNAL ELASTIC LAYER AND METHOD OF USING SAME FOR BONDING BODIES TO ONE ANOTHER

BACKGROUND OF THE INVENTION

The present invention relates to a new and improved multi-layer adhesive material for producing an adhesive bond or connection between two essentially parallel dispositioned surfaces, especially for the adhesive bond between the surface of a ski and the surface of an attachment body to be connected to the ski, the adhesive material having two outer adhesive surfaces and at least one predominantly elastic carrier layer. The invention also is concerned with a new and improved method of using such multilayer adhesive material for providing the adhesive bond between the two surfaces.

Heretofore known adhesive materials of this general type usually have a carrier layer formed of elastic foam plastic having a thickness of, for instance, 0.4 mm. Both faces of the carrier layer support a thin adhesive layer formed of an extreme rubber elastic or elastomeric material. This high elasticity of the adhesive layer is intended to provide good adaptation to the surface profile of the surfaces which are to be bonded to one another and to insure good adhesion, even at relatively low temperatures. The elastic carrier layer compensates slight differences in spacing between the surfaces to be interconnected. These slight spacing differences between such surfaces usually are present due to irregularities appearing at both surfaces. Further, the elastic carrier layer, upon loading the adhesive bond, insures a uniform distribution of the forces at the adhesive surfaces. Additionally, it can dampen suddenly applied forces or blows. Compensation of the differences in the spacing of the surfaces by virtue of the elasticity of the carrier layer, is however associated with the drawback that at the surface regions of the adhesive bond, where the spacing is greatest, traction or tensile forces continuously act upon the adhesive bond. These traction or tensile forces are caused by the elastic restoring force of the compressed together region or zone of the carrier layer. These tensile forces, particularly at apertured-like surface depressions, produce a localized detachment of the adhesive layer and a corresponding weakening of the adhesive bond.

SUMMARY OF THE INVENTION

Therefore, with the foregoing in mind it is a primary object of the present invention to overcome the aforementioned drawbacks and limitations of the prior art as above explained.

Another and more specific object of the present invention aims at providing a new and improved construction of a multi-layer adhesive material affording an increased strength of the adhesive bond, also at profiled surfaces.

Still a further significant object of the present invention relates to a new and improved method of using the adhesive material for establishing a good bond between bodies which are to be interconnected to one another.

Now in order to implement these and still further objects of the invention, which will become more readily apparent as the description proceeds, the adhesive material of the previously mentioned type is manifested by the features that in addition to the predominantly elastic carrier layer there is provided at least one predominantly plastic carrier layer which has at the outwardly directed side or face thereof, one of the two adhesive surfaces of the adhesive material. By virtue of the fact that the material layer bounding at the adhesive surface is predominantly plastic, surface irregularities are beneficially compensated, without there being formed at the region of the surface depressions, elastic restoring forces which are continuously effective at the adhesive surface. Thus, in the adhesive material, with complete plasticity of one of the carrier layers, there are not present any permanent inner stresses, and importantly, without losing the previously mentioned advantages of the predominantly elastic carrier layer. It should be understood that there is strived for as complete as possible plasticity of the predominantly plastic carrier layers.

By means of the inventive adhesive material, and in contrast to the heretofore known adhesive materials, when using profiled or structured surfaces, there is in fact obtained, due to the enlarged adhesive surface, a greater strength of the adhesive bond, so that there is recommended a suitable preparation of the surfaces to be interconnected, for instance by stamping, milling, grinding, drilling and the like.

When using the adhesive material for interconnecting a flat or planar surface with a non-planar and/or profiled surface, it is adequate if only one of the two adhesive surfaces of the adhesive material is located at a predominantly plastic carrier layer. For the correct use of the material, both of the adhesive surfaces must be appropriately identified, for instance by dyeing or coloring the same in a suitable way or by providing any other suitable identification expedients.

According to a preferred exemplary embodiment of the invention, the adhesive material however possesses two plastic carrier layers, enclosing therebetween an elastic carrier layer.

The adhesive surfaces of the material, prior to use, can be covered in the usual fashion with a tear-off protective layer, for instance formed of silicone paper.

The inventive adhesive material is particularly suitable, for instance, for the adhesive attachment of an attachment body to the surface of a ski, since it has been found that, when using adhesive materials of the previously mentioned type, frequently such adhesive bond is destroyed. The plastic carrier layer insures a uniform accommodation to the usually not completely flat or planar ski surface, whereas the elastic carrier layer can take-up the elastic bending of the ski as well as the impact forces or blows. As a result, the forces which arise can be uniformly distributed.

The plastic properties of the plastic carrier layer especially have importance when producing the adhesive bond, so that a subsequent solidification, for instance by cooling, is not disadvantageous.

As to the different layers of the inventive adhesive material, it is possible to use different commercially available materials, provided of course that they have the aforementioned properties and can be permanentlly connected to one another.

The inventive adhesive material can also be formed by adhesively bonding or heat sealing or otherwise welding two standard multi-layer adhesive materials. As an example of this there is mentioned the combination between two commercially available "3M"-adhesive tapes, which can be obtained under the commercial designations "411" and "Y-4921" from Minnesota Mining & Manufacturing Company. The "3M"-adhesive tape 411" has the aforementioned plastic properties, in that its carrier layer is formed of soft-PVC-foil, whereas the "3M"-adhesive tape "Y-4921" has the aforementioned elastic properties in that its carrier layer is formed of an elastomeric-foam plastic. Each of the two adhesive tapes has a thickness of about 0.4 mm.

As already mentioned, the invention is not only concerned with the aforementioned multi-layer adhesive material, but also relates to a new and improved method of using the same and to a new and improved method for establishing an adhesive bond between two bodies by means of the multilayer adhesive material. According to the method of the invention, a first surface of the body to be connected by the adhesive bond with another body is profiled or shaped in order to increase its adhering surface. This first body surface confronts the predominantly plastic carrier layer of the adhesive material.

The profiling or shaping of the adhering surface of the body can be accomplished by, for instance, stamping or milling.

Additionally, it is within the contemplation of the teachings of the invention to produce the adhesive connection or bond at a temperature which is greater than that to be expected when loading the adhesive bond during use of the body provided with the adhesive material, so that the plastic carrier layer, during production of the adhesive bond, can be more easily plastically deformed than after subsequent cooling thereof.

BRIEF DESCRIPTION OF THE DRAWINGS

The invention will be better understood and objects, other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
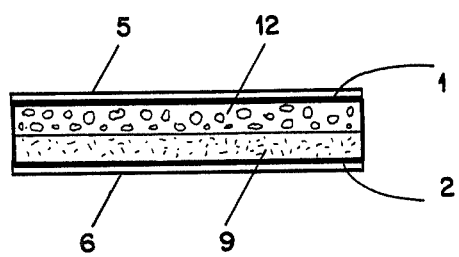
FIG. 1 is a schematic cross-sectional view through an adhesive material having a plastic carrier layer according to a first embodiment of the invention.
Figure 2:
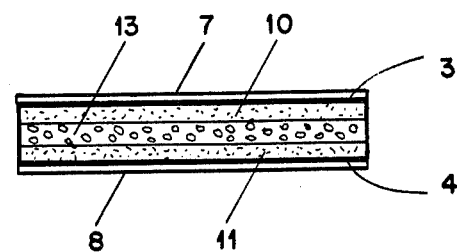
FIG. 2 is a cross-sectional view through an adhesive material having two plastic carrier layers according to the invention.

Describing now the drawings, it is to be appreciated that the drawings are not to scale and there have been shown in FIGS. 1 and 2 adhesive materials on a scale corresponding for instance to about 1:10. Turning attention to the embodiment of adhesive material shown in FIG. 1, the same will be seen to comprise a predominantly plastic carrier lalyer 9 with which there is permanently connected a predominantly elastic carrier layer 12. The outer faces of the predominantly elastic carrier layer 12 and the predominantly plastic carrier layer 9 have adhesive surfaces 1 and 2 respectively formed by an adhesive layer and are covered, prior to use, by a protective layer, such as a protective paper layer 5 and 6 respectively, for instance silicone paper.

In the modified construction of multi-layer adhesive material shown in FIG. 2 there is provided a sandwich arrangement of three layers, comprising an intermediate predominantly elastic carrier layer 13 and two outer predominantly plastic carrier layers 10 and 11, the three layers 10, 13 and 11 being intimately permanently bonded to one another. The outer faces or surfaces of the predominantly plastic carrier layers 10 and 11 have adhesive surfaces 3 and 4. Also these adhesive surfaces 3 and 4, like in the arrangement of FIG. 1, can be covered prior to use with a protective layer 7 and 8, such as the previously mentioned silicone paper. The carrier layers 10, 13 and 11 can be adhesively bonded to one another to form the composite multi-layer adhesive material. The thickness of the adhesive material, depending upon the number of carrier layers which are employed, advantageously amounts to about 0.2 to 1 mm. Further, the thickness of the predominantly plastic carrier layer 9 (FIG. 1) or layers 10 and 11 (FIG. 2) amounts to about 40% to 60% of the total thickness of the adhesive material. The predominantly elastic carrier layer 12 (FIG. 1) and 13 (FIG. 2) is permanently elastic and the predominantly plastic carrier layer, such as layer 9 of FIG. 1, and layers 10 and 11 of FIG. 2, are for instance soft-plastic during production of the adhesive bond or connection and then can be subsequently solidified or hardened, for instance by cooling.

Figure 3:
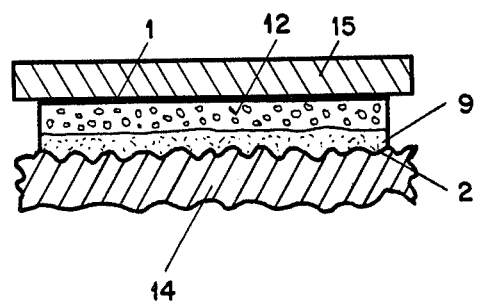
FIG. 3 is a sectional view of the adhesive material shown in FIG. 1 bonded to a profiled surface, such as the top surface of a ski.

Finally, in FIG. 3 there is shown a preferred manner of using the multi-layer adhesive material, here of the type shown in FIG. 1, for connection thereof with a body, such as the top surface 2 of a ski 14. As mentioned, an advantageous environment of use of the multi-layer adhesive material is for the interconnection of an attachment body 15, such as a standard ski anti-crossover protection device, with the top surface 2 of a ski 14. It has been found advantageous to appropriately profile or shape the top surface 2 of the body 14, here the ski, for increasing its adhering surface. This top surface 2 of the body 14 can be appropriately shaped or profiled, for instance by stamping or milling or carrying out any other suitable working operations. This top surface 2 of the body 14 confronts the predominantly plastic carrier layer 9 of the adhesive material. Thereafter, the protective paper layers 5 and 6 are removed and the attachment body 15, such as the ski anti-crossover protection device, then is connected by means of the adhesive surface 1 at the upper predominantly elastic carrier layer 12. FIG. 3 further shows the plastic deformation of the carrier predominantly plastic layer 9 after the adhesive material of FIG. 1 has been pressed onto the profiled top surface 2 of the body 14.

As also heretofore mentioned, the adhesive connection is advantageously produced at a higher temperature than that expected to be encountered during loading of the adhesive bond during use of the body 14, here the ski equipped with the adhesive material, so that the plastic carrier layer 9 or layers 10 and 11, during production of such adhesive bond, can be more easily plastically deformed than following subsequent cooling.

While there are shown and described present preferred embodiments of the invention, it is to be distinctly understood that the invention is not limited thereto, but may be otherwise variously embodied and practiced within the scope of the following claims. Accordingly,

What I claim is:

1. A multi-layer composite for producing an adhesive bond between two substantially mutually parallel surfaces comprising two outer adhesive layers, one on each opposed major face, a plastic carrier layer immediately adjacent one outer adhesive layer and an elastic carrier layer adjacent the plastic carrier layer.

2. The multi-layer composite of claim 1 wherein a second plastic carrier layer is disposed immediately adjacent the second outer adhesive layer interior thereto.

3. The composite as defined in claims 1 or 2, wherein:
the total thickness of the composite amounts to about 0.2 to 1 mm.

4. The composite as defined in claims 1 and 2, wherein:
the thickness of the predominantly plastic carrier layer amounts to about 40% to 60% of the total thickness of the composite.

5. The composite as defined in claim 2, wherein:
the elastic carrier layer is sandwiched between and heat-sealed to the plastic carrier layers.

6. A method of bonding a first body to a second body by means of an adhesive material, comprising the steps of:
profiling a surface of the first body which is to be connected with the second body in order to increase its adhering surface;
pressing said surface of the first body against an adhesive surface of the composite of claim 1 or claim 2 and bonding the surfaces together; and pressing a surface of a second body against the other adhesive surface of the composite of claim 1 or claim 2 and bonding the surfaces together.

7. The method as defined in claim 6, wherein:
profiling of the adhering surface of the first body is accomplished by stamping.

8. The method as defined in claim 6, wherein:
profiling of the adhering surface of the first body is accomplished by milling.

9. The method as defined in claim 6, wherein:
said adhesive bonding is produced at a temperature greater than the temperature expected during loading of the adhesive bonds when said first body is in use, so that the adhesive layers are more easily plastically deformable during production of the adhesive bonds than after subsequent cooling.

* * * * *